United States Patent
Vasil'evich et al.

(10) Patent No.: US 7,848,461 B2
(45) Date of Patent: Dec. 7, 2010

(54) APPARATUS AND METHOD FOR SIGNAL RECEPTION IN MULTIPLE INPUT MULTIPLE OUTPUT (MIMO) COMMUNICATION SYSTEM

(75) Inventors: Garmanov Alexander Vasil'evich, Voronezh (RU); Joseph Robert Cleveland, Murphy, TX (US); Karpinsky Yuri Evgen'evitch, Voronezh (RU); Kravtsova Galina Semenovna, Voronezh (RU)

(73) Assignee: Samsung Electronics Co., Ltd (KR)

( * ) Notice: Subject to any disclaimer, the term of this patent is extended or adjusted under 35 U.S.C. 154(b) by 888 days.

(21) Appl. No.: 11/705,800

(22) Filed: Feb. 13, 2007

(65) Prior Publication Data
US 2007/0201577 A1    Aug. 30, 2007

(30) Foreign Application Priority Data
Feb. 13, 2006    (RU) ............................. 2006104196

(51) Int. Cl.
*H04L 27/06* (2006.01)

(52) U.S. Cl. .................. 375/340; 714/100; 714/780

(58) Field of Classification Search ............... 375/285, 375/340, 346–347; 714/758, 780, 799, 100
See application file for complete search history.

(56) References Cited

U.S. PATENT DOCUMENTS

| | | | |
|---|---|---|---|
| 5,822,310 A * | 10/1998 | Chennakeshu et al. ...... 370/317 |
| 6,046,990 A * | 4/2000 | Chennakeshu et al. ...... 370/317 |
| 6,487,255 B1 | 11/2002 | Arslan et al. | |
| 6,574,293 B1 | 6/2003 | Khayrallah et al. | |
| 6,580,930 B1 * | 6/2003 | Fulghum et al. ............. 455/574 |
| 6,606,726 B1 * | 8/2003 | Wilhelmsson et al. ........ 714/758 |
| 6,967,598 B2 * | 11/2005 | Mills ........................... 341/50 |
| 6,981,200 B2 * | 12/2005 | Maung et al. ............... 714/781 |
| 7,234,095 B2 * | 6/2007 | Lee et al. ..................... 714/751 |
| 7,519,898 B2 * | 4/2009 | Narayanan et al. ........... 714/801 |
| 2004/0174939 A1 | 9/2004 | Wang | |
| 2004/0228423 A1 | 11/2004 | Gueguen | |
| 2006/0280204 A1 * | 12/2006 | Nagata et al. ............... 370/473 |
| 2007/0274407 A1 * | 11/2007 | Thomson et al. ............ 375/260 |

FOREIGN PATENT DOCUMENTS

| | | |
|---|---|---|
| KR | 1020000005544 | 1/2000 |
| WO | WO 97/40589 | 10/1997 |

* cited by examiner

*Primary Examiner*—Jean B Corrielus
(74) *Attorney, Agent, or Firm*—The Farrell Law Firm, LLP (57) ABSTRACT

A method for signal reception in a Multiple-Input-Multiple-Output (MIMO) communication system is provided. The method enhances the efficiency of signal reception in the MIMO system and simplifies the algorithms of signal reception and soft decoding metrics generation. In other words, soft decisions are generated according to correlations between metrics corresponding to least reliable bits based on MMSE linear estimation and noise variance estimation is provided to improve performance when an error is generated in channel matrix H estimation.

20 Claims, 4 Drawing Sheets

APPARATUS AND METHOD FOR SIGNAL RECEPTION IN MULTIPLE INPUT MULTIPLE OUTPUT (MIMO) COMMUNICATION SYSTEM

PRIORITY

This application claims priority under 35 U.S.C. §119(a) to a Russian Patent Application filed in the Russian Federal Institute of Industrial Property on Feb. 13, 2006 and assigned Serial No. 2006104196, the entire disclosure of which is hereby incorporated by reference.

BACKGROUND OF THE INVENTION

1. Field of the Invention

The present invention relates to a communication system, and more particularly, to a method and apparatus for signal reception in a Multiple Input Multiple Output (MIMO) communication system.

2. Description of the Related Art

An efficient way of providing increased throughput of a modern wireless communication system is to use multiple transmit and receive antennas (MIMO—Multiple-Input-Multiple-Output), that is, more than one transmission channel—transmit antennas and more than one reception channel—receive antennas are used.

A set of signal propagation channels between the transmit and the receive antennas is called a MIMO channel. Throughput increase in MIMO systems is achieved by parallel transmission of different data over different spatial channels. In the case most important in practice the instant MIMO channel implementation can be estimated at the receive end but this estimate is unavailable at the transmit end.

Due to lack of information about the MIMO channel state at the transmit end, there is no possibility to optimize information transmission over parallel spatial channels, which results in generation of mutual interference at the receive end by signals transmitted through different antennas.

The most widespread transmission technique in MIMO systems is spatial multiplexing.

According to spatial multiplexing technique, coding, interleaving and modulation of the initial binary symbol (or bit) stream are performed in the transmitter, thus forming a stream of the modulation symbols s, each representing L sequential bits of the initial stream and belonging to the set $2^L$ of various values. This stream is divided into packets. The number of symbols in each packet corresponds to the number of transmit antennas N and the entire packet is transmitted at once, i.e. one modulation symbol via each antenna.

Reception is performed by means of $M \geq N$ receive antennas. A set of signals of the receive antennas is usually represented by an M-dimensional vector which can be expressed as a linear combination, as set forth in Equation (1):

$$x = H \cdot s + n \qquad (1),$$

where $s=[s_1, \ldots s_N]^T$, $x=[x_1, \ldots x_M]^T$ are the vectors of the transmitted and received signals, respectively, H is channel matrix, whose elements $h_{i,j}$ represent complex transfer coefficients from the j-th transmit to the i-th receive antenna, $n=[n_1, \ldots n_M]^T$ is the receive antenna additive Gaussian noise vector, $[.]^T$ is the sign of transposition.

When receiving such a multi-dimensional signal, channel matrix H is primarily estimated and then the symbols of vector s are demodulated using this estimate.

Therefore, the efficiency of the spatial multiplexing approach is determined by the receive algorithm efficiency, i.e. its ability to restore signals transmitted over parallel spatial channels taking into account their interference and additive noise.

The most efficient multi-dimensional signal reception algorithm is a Maximum Likelihood Algorithm (MLA).

For example, this method considers all possible combinations of simultaneously transmitted information symbols (all possible values of the vector s) and such value of vector s is selected, which provides the decision function minimum. Squared norm of the difference between the vector x of the received signals and the vector s is transformed by premultiplication by the channel matrix H. Therefore, the set of estimates of the transmitted packet s of symbols can be expressed by the vector z, as set forth in Equation (2):

$$z = \operatorname*{argmin}_{s \in A} \|x - Hs\|^2, \qquad (2)$$

where A is the set of all kinds of the vector s.

However, MLA implementation is very complex and its complexity increases exponentially with the growing number of transmit antennas and the number of information bits transmitted through each antenna.

Therefore, on practical grounds linear reception methods are more attractive when the transmitted symbol vector estimate is expressed through linear transformation of the received signals vector x. Such reception methods are described in Robust Linear MIMO Receivers.

In such methods, the linear transformation coefficients are formed so as to optimize the estimate according to some criterion. The most efficient linear method is the Minimum Mean Squared Error (MMSE) algorithm.

Linear algorithms produce lower performance than the maximum likelihood method. Therefore, a Successive Interference Cancellation (SIC) method is often used along with linear reception methods. Also, in well-known Ordered Successive Interference Cancellation (OSIC) algorithms, each symbol of the packet s is estimated successively given the interference caused by other symbols is rejected or reduced.

When receiving using MMSE method with OSIC (MMSE-OSIC), the channel matrix H is estimated and the order of estimating the symbols of vector s is determined so as to first estimate the symbols least distorted by the propagation channel. Usually the ordering criterion is the values of the matrix H vectors-columns norms. Next, the first symbol estimate is formed by MMSE. This estimate is quantized, that is, the modulation symbol closest to the estimate is determined in the modulation map. Then the contribution of the symbol is excluded from the input symbol vector by subtracting the result of converting the symbol value by the propagation channel. Further, using this "purer" input signal and the estimate of the channel matrix, modified by ordering and excluding the first column, the MMSE estimate is generated for the next symbol of the vector s. The procedure is repeated for all symbols of the vector s.

The OSIC procedure allows for the gain in the MIMO signal reception performance. This gain, however, depends greatly on using coding. Thus, in terms of performance before the decoder, MMSE-OSIC provides high gain compared to MMSE. This gain remains to some extent when convolutional coding and hard decoding are used. However, when soft decoding is used, the MMSE-OSIC either does not provide any gain or leads to a loss.

This example underlines another important aspect of the design of the MIMO algorithm. That is, any MIMO algorithm should be properly combined with other signal processing algorithms in the communication system and first of all with a forward error correction coding algorithm.

During reception, the produced symbol estimates z are usually demodulated, converted to a binary form and applied to the decoder to restore the initial data stream. The most efficient decoding is soft decoding. Soft bit estimates (decisions) are applied to the decoder in the form of {B −B}, where the sign corresponds to the hard estimate of the transmitted bit 1 or −1, and the absolute value B is a metric representing the probability that the bit takes the hard value.

A soft decision of some bit $b_k$ is the Log-Likelihood Ratio (LLR). With no a priori information about the transmitted bit values available and provided the transmitted bits are mutually independent, the LLR for the k-th bit of the transmitted vector s can be expressed with high approximation degree as set forth in Equation (3):

$$LLR_k = \frac{1}{2\sigma^2}\left(\min_{s \in A_k^{(-1)}} \|x - HS\|^2 - \min_{s \in A_k^{(1)}} \|x - HS\|^2\right), \quad (3)$$

where $A_k^{(1)}$ and $A_k^{(-1)}$ are the sets of the vector s values for which the k-th bit takes on the values 1 and −1, respectively, $\|.\|$ is the vector norm.

Forming of metrics by this expression significantly complicates the reception algorithm, because the number of elements of the sets $A_k^{(1)}$ and $A_k^{(-1)}$ increases exponentially with the increased number of antennas and modulation constellation size.

Linear methods and SIC based methods allow for the simplified soft decision generation, which is performed for each symbol individually using the obtained symbol estimate and the modulation map.

There is also a decoding method and apparatus having low complexity and high performance in a communication system using multi-dimensional signaling, in which the transmitted symbols are estimated by some suboptimal method and the soft decisions are generated. Then a reduced search set, comprising the transmitted symbols vectors, corresponding to all kinds of the least reliable bits combinations, is generated. Then new soft decisions are generated based on the reduced search set and the transmitted signals vector.

The MMSE method using the suboptimal algorithm provides the best tradeoff between implementation complexity and performance when soft decoding is concerned. In addition, the efficiency of such soft decisions generation is relatively low. Computer simulation shows that given the small amount of reduced search, the performance of this method is even lower than that of the MMSE. To obtain significant gain, this set should be increased, which essentially complicates the algorithm.

SUMMARY OF THE INVENTION

An aspect of the present invention is to address at least the above problems and/or disadvantages and to provide at least the advantages described below. Accordingly, an aspect of the present invention is to provide a method and apparatus to improve the efficiency of signal reception in a communication system.

Moreover, an aspect of the present invention is to provide a method and apparatus to improve efficiency by simplifying a decoding operation of a reception unit through 2-degree decoding with respect to values having minimum soft estimates of bits of an estimated vector symbol of a received signal.

In accordance with an aspect of the present invention, there is provided an apparatus for signal reception in a communication system. The apparatus includes at least one receive antenna for receiving signals modulated into bit-based symbols in accordance with a given modulation type, and dividing the modulated symbol stream into packets of some symbols each; and a signal demodulator for performing bit correction with respect to the modulated symbols to detect unreliable bits satisfying a predetermined condition.

In accordance with another aspect of the present invention, there is provided a method for signal reception in a communication system. The method includes receiving signals modulated into bit-based symbols in accordance with a given modulation type, and dividing the modulated symbol stream into packets of some symbols each; and performing bit correction with respect to the modulated symbols to detect unreliable bits satisfying a predetermined condition.

BRIEF DESCRIPTION OF THE DRAWINGS

The above and other features and advantages of exemplary embodiments of the present invention will be more apparent from the following detailed description taken in conjunction with the accompanying drawings, in which.

DETAILED DESCRIPTION OF THE EXEMPLARY EMBODIMENT

The matters defined in the description such as a detailed construction and elements are provided to assist in a comprehensive understanding of exemplary embodiments of the invention. Accordingly, those of ordinary skill in the art will recognize that various changes and modifications of the embodiment described herein can be made without departing from the scope and spirit of the invention. Throughout the drawings, the same drawing reference numerals will be understood to refer to the same elements, features and structures. Also, descriptions of well-known functions and constructions are omitted for clarity and conciseness. The terminology used in the description is defined in consideration of the function of corresponding components used in the present invention and may be varied according to users, operator's intention, or practices. Accordingly, the definition must be interpreted based on the overall content disclosed in the description.

The present invention provides a method of signal reception for a Multiple Input Multiple Output (MIMO) communication system, in which the transmitted bit stream is modulated in accordance with a given modulation type. The modulated symbol stream is then divided into packets containing N modulation symbols, and the packets are transmitted via N transmission channels.

At a receiving end including M receive antennas, i.e., M receiving channels, the symbols transmitted via the transmission channels are decoded as follows.

The receiving end receives a signal via the M receiving channels forming M-dimensional vector x of the received signals for each of the transmitted modulation symbol packets.

The receiving end estimates signal transfer coefficients from the transmitting channels to the receiving channels, forms the matrix H of transfer coefficients and estimates the combined variance $\sigma^2$ of noise in the M receiving channels and possible error in the transmission coefficient estimate of the matrix H.

The receiving end forms symbol estimates of each transmitted modulation symbol packet formed as elements of the vector z, obtained by the linear conversion of the M-dimensional vector of the received signals, as set forth in Equation (4):

$$z = W^\dagger x \quad (4),$$

where $W = (HH^\dagger + \sigma^2 I)^{-1} H$ is a linear transformation matrix, I is an M×M diagonal unitary matrix, $(.)^\dagger$ is the sign of transposition and complex conjugation, and $(.)^{-1}$ is the sign of matrix inversion.

The receiving end demodulates an estimate of each symbol of the transmitted packet according to the given modulation type, and generates the values of the respective bits as hard estimates and these values' reliability metrics as soft estimates, thus forming the set of initial soft and hard estimates of the transmitted packet bits. At the receiving end, K least reliable bits are determined in the set of initial hard estimates as those with minimum soft estimates absolute values.

The receiving end forms a set V of the transmitted symbols vectors according to the given modulation type using the initial hard estimates of the bits of each transmitted packet. Here, all possible combinations of K least reliable bit values correspond to a subset of the vectors and other bit values of these vectors are equal to their initial hard estimates.

The receiving end determines the improved estimates of the transmitted packet symbols as a vector of the set V, for which the decision function F(v) takes on the minimum value, demodulates the improved estimates of the transmitted packet symbols, thus generates the improved hard estimates of the transmitted packet bits, and forms the improved soft estimates of the transmitted packet bits by means of the initial soft and hard estimates and the improved hard estimates of the transmitted packet bits as well.

For example, the improved soft estimate of a bit is generated by comparing the improved hard estimate with the initial hard estimate of this bit; if they match, the initial soft estimate is used as the improved soft estimate of the bit; if they do not match, the initial soft estimate with the opposite sign and the absolute value multiplied by the certainty factor $\beta \leq 1$ is used.

To detect the unreliable bits, corresponding to the packet s of the transmitted symbols, the maximum number $K_{max}$ of tested bits of the transmitted packet is determined in advance, and $K_{max}$ bits with least absolute values of the soft estimates B are selected. In other words, the absolute values |B| of the selected bit soft estimates are compared to the threshold $B_t$ and the bits for which these values are lower than the threshold are selected. The threshold can be defined as the mean absolute value of the soft estimates of all bits of vector s. The decision function of the MLA may be used as the decision function F(v).

Although the present invention is described based on an MIMO communication system by use of spatial multiplexing using multi-dimensional signals, it may also be applied to other communication systems.

Figure 1:
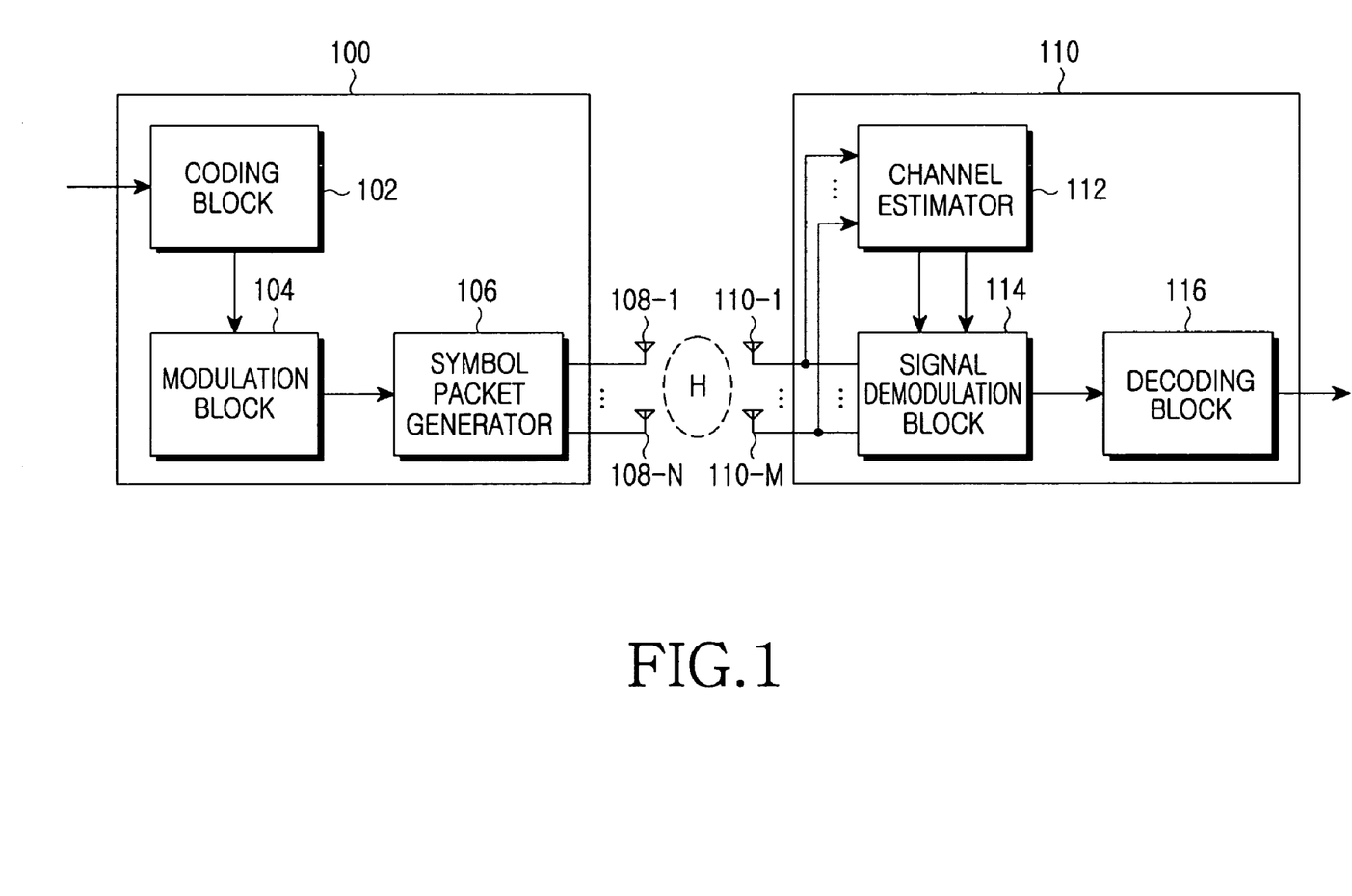
FIG. 1 is an exemplary structure of a receiver and a transmitter in the MIMO communications system, made in accordance with the spatial multiplexing principle.

FIG. 1 is an exemplary structure of the receiver and the transmitter in the MIMO communications system, made in accordance with the spatial multiplexing principle.

Referring to FIG. 1, a transmitter 100 includes a coding block 102, a modulation block 104, a symbol packet generator 106, and N transmit antennas 108-1 through 108-N. A receiver 110 includes M receive antennas 110-1 through 110-M, a channel estimator 112, a signal demodulation block 114, and a decoding block 116.

A data message in binary form is input to the transmitter 100 and the coding block 102. The coding block 102 performs forward error correction coding and interleaving on the binary message bits so as to generate a coded bitstream. The coded bitstream is fed to the input of the modulation block 104.

Hereinafter, the detailed structures of the transmitter 100 and the receiver 110 will be described with reference to FIGS. 2 and 3.

Figure 2:
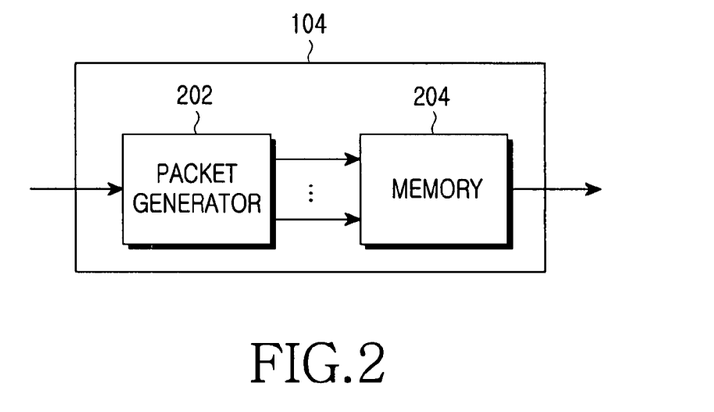
FIG. 2 is an exemplary block diagram of a modulation block.

FIG. 2 is an exemplary block diagram of the modulation block 104.

Referring to FIG. 2, the modulation block 104 includes a packet generator 202 and a memory 204 that are connected in series.

The packet generator 202 transforms the coded bitstream from serial to parallel form, i.e., divides the coded bitstream into packets each having L bits. Each packet representing the L-bit binary number, arrives at the memory 204 input, where $2^L$ all possible modulation symbols are stored. The memory 204 determines the modulation map, i.e. the set correspondence between the modulation symbols and L-bit binary numbers.

In the memory 204, the modulation symbol corresponding to the L-bit binary number is applied to its input. Each modulation symbol is a complex number s. The magnitude of this complex number corresponds to the amplitude, and its argument corresponds to the phase of the harmonic radio signal, used to transmit this symbol. At this time, various well-known modulation methods such as Quadrature Phase Shift Keying (QPSK), M-Quadrature Amplitude Modulation (M-QAM) and the like may be used.

The generated modulation symbol stream is used as an input to the symbol packet generator 106 of FIG. 1. The symbol packet generator 106 divides the modulation symbol stream into packets of N symbols each. Each packet is transmitted simultaneously via N transmit antennas using the respective modulation of the radio signal of each transmit antenna.

Although not shown in figures, each of the transmit antennas 108-1 through 108-N includes carrier frequency radio signals generators, and signals received via the M receive antennas 110-1 through 110-M are processed in antenna channels at the radio frequency.

The signal of each receive antenna is represented as the complex number x, the magnitude of which reflects the amplitude of the received signal, and the argument reflects its phase. Thus, for each transmitted modulation symbol packet, the M-dimensional vector of the received signals $x=[x_1, \ldots x_M]^T$ is generated. x is input to the signal demodulation block 114 and the channel estimator 112. The estimated values of the channel matrix H and the combined variance $\sigma^2$, generated in the channel estimator 112, are fed to other inputs of the signal demodulation block 114.

Figure 3:
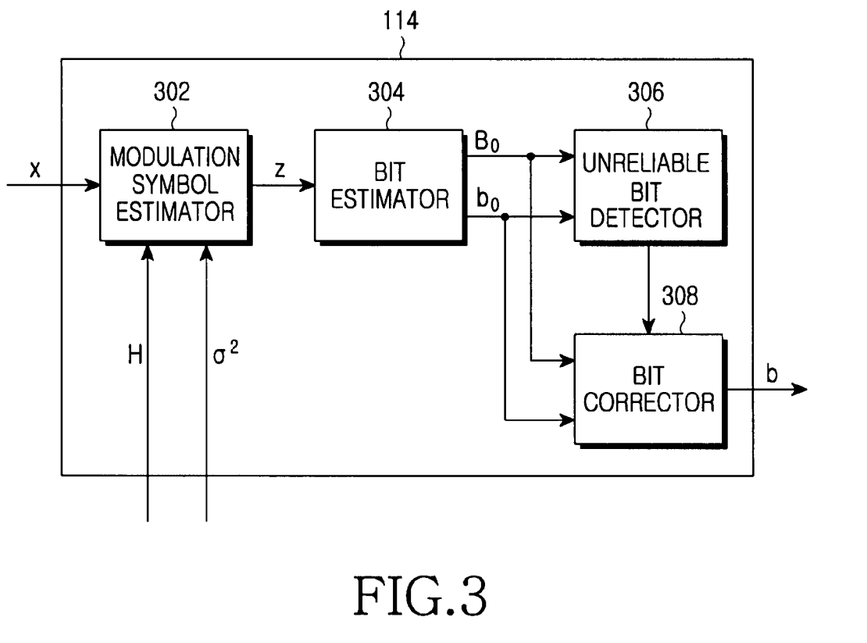
FIG. 3 is an exemplary block diagram of a signal demodulation block.

FIG. 3 is an exemplary block diagram of the signal demodulation block 114.

Referring to FIG. 3, the signal demodulation block 114 includes a modulation symbol estimator 302, a bit estimator 304, an unreliable bit detector 306, and a bit corrector 308.

The signaling input x of the modulation symbol estimator 302 is the first input of the modulation symbol estimator 302 and at the same time the respective input of the signal demodulation block 114. The second input of the modulation symbol estimator 302 is the input of the channel matrix H estimated values. The third input of the modulation symbol estimator 302 is the combined variance $\sigma^2$. The channel matrix H estimated values and the combined variance $\sigma^2$ are inputs generated by the channel estimator 112.

The modulation symbol estimator 302 is connected to the bit estimator 304, two outputs of which are connected with the respective inputs of the unreliable bit detector 306 and the bit corrector 308. The output of the unreliable bit detector 306 is connected to the bit corrector 308, and the output of the bit corrector 308 is at the same time the output of the signal demodulation block 114.

In the modulation symbol estimator 302, the linear transformation coefficients used to perform MMSE estimation are generated. These coefficients form the M×N matrix W. All M elements of each i-th matrix column correspond to the set of linear transformation coefficients used to estimate the respective i-th symbol of the transmitted vector s $i=\overline{1,N}$. The generation algorithm can be represented by Equation (5):

$$W=(HH^\dagger+\sigma^2 I)^{-1}H \qquad (5)$$

Then the estimates of the transmitted vector symbols are generated as the elements of the vector z as shown in Equation (6):

$$z=W^\dagger x \qquad (6)$$

These estimates are fed to the input of the bit estimator 304, where the estimate of each modulation symbol of the transmitted packet is demodulated in accordance with the modulation type.

This operation is executed, for example, in the following way.

For each k-th bit, transmitted using the m-th modulation symbol, the soft decision metric or the soft estimate is generated as shown in Equation (7):

$$B_{k,m}=LLR_{k,m} \qquad (7)$$

If the LLR value is generated according to Equation (3), the coefficient $\beta_m$ is expressed according to Equations (1) and (2), as shown in Equation (8):

$$\beta_m=w^\dagger_m h_m \qquad (8)$$

where $w_m$ is the m-th column of matrix W, and $h_m$ is the m-th column of matrix H.

The hard estimate $b_{k,m}$ of each k-th bit, transmitted by the m-th modulation symbol, can be written as Equation (9):

$$b_{k,m}=\begin{cases} 1, & \text{if } B_{k,m} \geq 0 \\ -1 & \text{if } B_{k,m}<0, \end{cases} \qquad (9)$$

where $b_{k,m}$ values at $k=\overline{1,L}$ and $m=\overline{1,N}$ form the set $b_0$ of the initial hard estimates. The $B_{k,m}$ values given the same k and m, respectively, form the set $B_0$ of the initial soft estimates of the transmitted packet bits. These sets $b_0$ and $B_0$ are fed to the respective inputs of unreliable bit detector 306.

The unreliable bit detector 306 detects unreliable bits of the transmitted symbols packet s based on the soft decision metric B reflecting the reliability of the corresponding bit estimation, according to:

1. The maximum number $K_{max}$ of tested bits is predetermined and $K_{max}$ bits with the least absolute values of soft estimates B are selected.

2. Absolute soft estimate values |B| of the bits selected at the stage (1), are compared to the threshold $B_t$ and the bits for which these values are below the threshold are selected. The threshold is calculated as Equation (10):

$$B_t=\alpha \cdot \text{mean}(|b|) \qquad (10),$$

where mean (|b|) is a mean value of the soft estimate absolute values over all bits of the vector s, and $\alpha \leq 1$ is the proportionality factor.

When such an unreliable bit detection algorithm is used, their number is $K \leq K_{max}$. Thus, by selecting $K_{max}$ in advance, the implementation complexity can be limited.

Other embodiments of the unreliable bit detection algorithm are also possible.

Therefore, the numbers of unreliable bits are generated at the output of the unreliable bit detector 306 and then fed to the input of the unreliable bit corrector 308.

Figure 4:
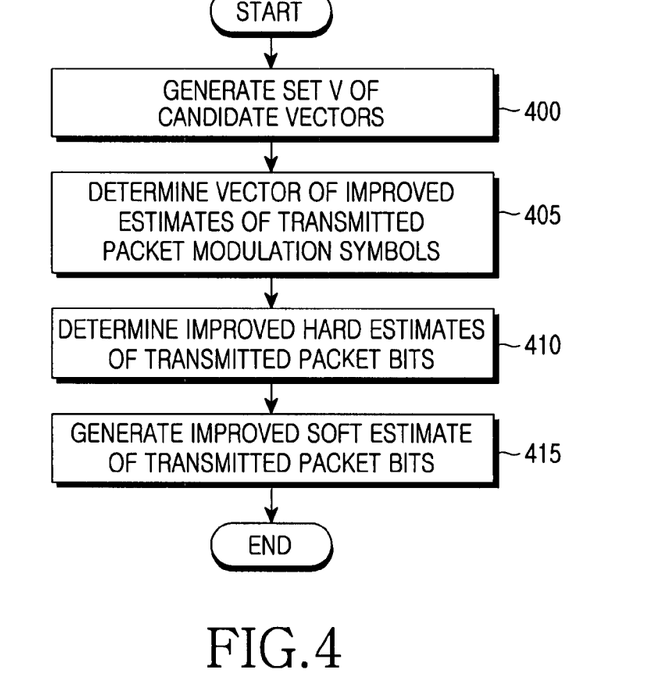
FIG. 4 is a flowchart showing the unreliable bits correction algorithm.

FIG. 4 is a flowchart of the unreliable bits correction algorithm.

Referring to FIG. 4, the bit corrector 308 generates the set V of the candidate vectors of the transmitted modulation symbols in step 400.

First, all possible combinations of K least reliable bit values are generated, in which the number of such combinations is $2^K$.

Second, a bit candidate packet $b_c$ for each combination of K least reliable bits is generated and the values of other bits of the transmitted packet are added to each of those combinations. At this time, these values are set to be equal to the initial hard estimates of the respective bits.

Third, the candidate packet $b_c$ of bits obtained for each combination, as shown, for example, when describing the modulation block 104, is modulated. In this way, the candidate vector v of modulation symbols, corresponding to each combination, and hence the set V of the modulation symbol candidate vectors v are generated.

In step 405, the vector of the improved estimates of the transmitted packet symbols is defined as the vector of the set V, for which the decision function F(v) takes the minimum value, as shown in Equation (11).

$$F(v)=\|x-Hv\|^2 \qquad (11)$$

In step 410, the bit corrector 308 determines the improved hard estimates of the transmitted packet bits, by demodulating the transmitted symbols' improved estimates vector. To do so, the modulation map is used. For each symbol of the improved estimates vector, the respective binary number is determined. The sequence of these binary numbers forms the set of the improved hard estimates of the transmitted packet bits.

In step 415, the bit corrector 308 generates the improved soft estimates of the transmitted packet bits, using the initial soft and hard estimates as well as the improved hard estimates of the bits.

For example, the improved soft estimate of a bit is generated by comparing the improved hard estimate with the initial hard estimate of this bit. If they match, the initial soft estimate is used as the improved soft estimate of the bit. If they do not match, the initial soft estimate with the opposite sign is used. When such transformation is carried out, the reliability of the soft decision is reduced. To take this into account, the absolute value of the soft estimate is multiplied by the factor $\beta \leq 1$. The algorithm analysis by means of computer simulation has shown its good performance at $\beta=0.3$.

Figure 5:
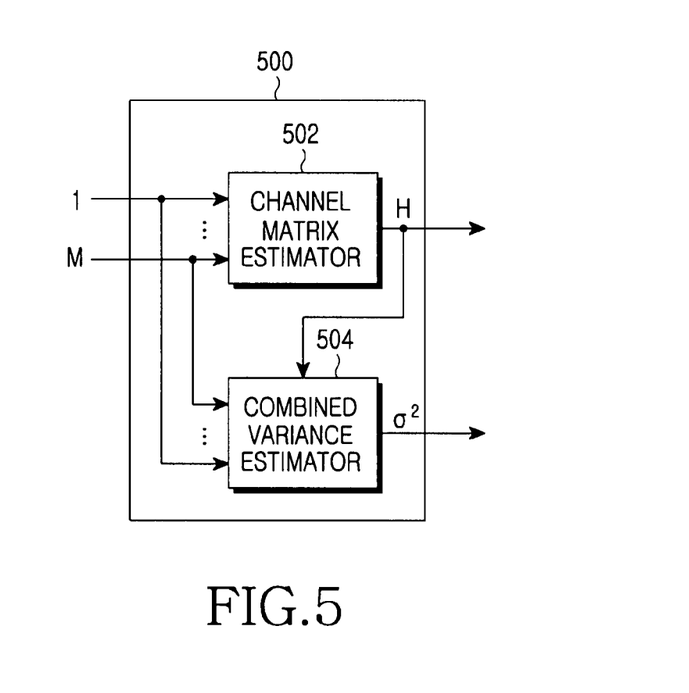
FIG. 5 is an exemplary block diagram illustrating a channel estimator.

FIG. 5 is an exemplary block diagram illustrating the channel estimator 500.

Referring to FIG. 5, the channel estimator 500 includes a channel matrix estimator 502 and a combined variance estimator 504.

M signaling inputs of the channel matrix estimator 502 are linked with the respective inputs of the combined variance estimator 504 and are at the same time inputs of the channel estimator 112. The output H of the channel matrix estimator 502 is connected with the respective input of the combined variance estimator 504. The output of the combined variance estimator 504 is the output $\sigma^2$ of the channel estimator 112.

In the channel matrix estimator 502, the coefficients of signal transmission between the transmitting channels and the receiving channels are estimated. To do this, the appropriate pilot signal containing the modulation symbol, known to the receiver, is transmitted via each transmit antenna along with the information signal.

For instance, each coefficient $\{h_{i,j}: i=\overline{1,M}, j=\overline{1,N}\}$ of signal transfer from the j-th transmit to the i-th receive antenna is estimated. The set of the obtained values is generated as the estimated channel matrix H and supplied to the respective input of the signal demodulation block 114.

In the combined variance estimator 504, the combined variance $\sigma^2$ of noise in M receiving channels and the possible error in the transmission coefficients matrix H estimation is estimated. More specifically, the combined variance estimate for the m-th receive antenna is given by Equation (12):

$$\hat{\sigma}_m^2 = \frac{1}{K}\sum_{k=1}^{K}|x_m(k) - \hat{h}_{m,n_k}(k) \cdot P_{n_k}(k)|^2, \quad (12)$$

where $P_{n_k}(k)$ is the pilot signal transmitted from the $n_k$-th transmit antenna at the k-th discrete moment of time, (it is assumed that to avoid interference the pilot signal is transmitted at some moment of time only from one antenna); $x_m(k)$ is the signal received by the m-th receive antenna at the k-th moment of time; $\hat{h}_{m,n_k}(k)$ is the estimate of the transmission factor of the signal propagation between the $n_k$-th transmit and the m-th receive antennas for the k-th point of time; and K is the estimation interval size.

Note that the noise variance in the receiver may be estimated in other ways, without taking into account the channel estimation. For example, the pre-generated communication channel estimates having a finite error are used as shown in Equation (13):

$$\hat{h}_{m,n} = h_{m,n} + \Delta h_{m,n}. \quad (13)$$

Consequently, the estimate $\hat{\sigma}_m^2$ includes both the noise deviation and the error $\Delta h_{m,n}$. The combined variance in the MMSE method used in Equations (4) and (5) provides partial compensation of the errors in the communications channel estimation. The positive effect owing to taking this error into account is increased due to checking and correcting the least reliable bits.

Figure 6:
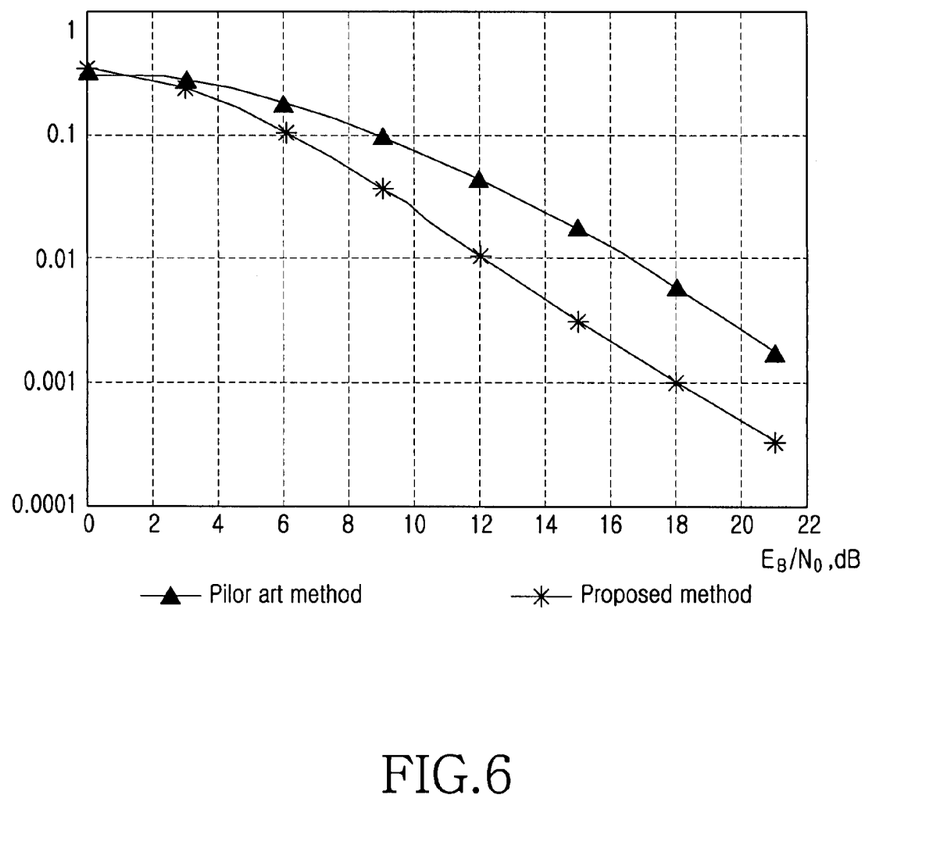
FIG. 6 is a graph showing comparative performance characteristics.

FIG. 6 is a graph showing comparative performance characteristics.

It can be seen from FIG. 6 that the coding block 102 of FIG. 1 performs deinterleaving and decoding for coding, thereby acquiring 3 dB gain and more.

Therefore, after MMSE linear estimation is performed at the receiving end to separate a reception signal for each transmit antenna, soft decision metrics are generated for the reception signals according to correlations between the metrics corresponding to the least reliable bits, in order to perform ML decoding only on reception signals having values lower than a predetermined threshold, i.e., signals that are highly likely to have an error in channel estimation. In doing so, the complexity of decoding is reduced.

While the invention has been shown and described with reference to exemplary embodiments thereof, it will be understood by those skilled in the art that various changes in form and details may be made therein without departing from the spirit and scope of the invention.

What is claimed is:

1. An apparatus for signal reception in a communication system, the apparatus comprising:

at least one receive antenna for receiving signals modulated into bit-based symbols in accordance with a given modulation type, wherein the received signals are divided into packets of predetermined symbols each; and a signal demodulator for performing bit correction with respect to the modulated symbols to detect unreliable bits satisfying a predetermined condition, wherein the signal demodulator comprises a modulation symbol estimator for estimating transmission coefficients of the received signals as a matrix H, estimating a combined variance $\sigma^2$ of noise generated from M receiving channels and a possible error in a transmission coefficient estimate of the matrix H, and estimating a vector symbol Z of the received signals using a Log-Likelihood Ratio (LLR) according to:

$$z = W^{\dagger}x$$

where $W=(HH^{\dagger}+\sigma^2I)^{-1}H$, W is a matrix of linear conversion, I is the M×M diagonal unitary matrix, $(.)^{\dagger}$ is a transposition and complex conjugation sign, and $(.)^{-1}$ is a matrix inversion sign.

2. The apparatus of claim 1, wherein the modulation symbol estimator demodulates the estimated vector symbol in accordance with the given modulation type.

3. The apparatus of claim 1, wherein the signal demodulator comprises:

a bit estimator for demodulating the transmission coefficients of the matrix H in accordance with the given modulation type and forming a set of initial soft and hard estimates of the estimated vector symbol by performing hard decision and soft decision; and an unreliable bit detector for determining the minimum value among absolute values of the generated soft estimates as a predetermined number of least reliable bits and comparing the determined minimum value with a threshold.

4. The apparatus of claim 3, wherein the bit estimator performs soft decision according to:

$$B_{k,m} = LLR_{k,m}$$

where k is a modulation symbol indicator of the estimated vector and m is a modulation symbol bit indicator of the estimated vector.

5. The apparatus of claim 4, wherein the bit estimator performs hard decision according to:

$$b_{k,m} = \begin{cases} 1, & \text{if } B_{k,m} \geq 0 \\ -1 & \text{if } B_{k,m} < 0 \end{cases}$$

where $b_{k,m}$ values at $k=\overline{1,L}$ and $m=\overline{1,N}$ form a set $b_0$ of the initial hard estimates, and $B_{k,m}$ values given the same k and m, respectively, form a set $B_0$ of the initial soft estimates of the transmitted packet bits.

6. The apparatus of claim 5, wherein the bit estimator determines the maximum number $K_{max}$ of tested bits K in advance and compares a soft estimate with the minimum value among absolute values |B| of soft estimates B with a threshold $B_t$ in order to select bits for which these values are lower than the threshold $B_t$.

7. The apparatus of claim 6, wherein the threshold $B_t$ is given by $$B_t = \alpha \cdot \text{mean}(|b|)$$

where mean (|b|) is a mean value of absolute values of all soft estimates b over all the transmitted packet bits, and $\alpha \leq 1$ is a proportionality factor.

8. The apparatus of claim 7, further comprising a bit corrector for generating all possible combinations of a predetermined number K of least reliable bit values, in which the number of such combinations is $2^K$, generating a bit candidate packet $b_c$ for each combination of the K least reliable bits, generating modulation symbol candidate vectors v corresponding to each combination by modulating the candidate packet $b_c$ of bits obtained for each combination, taking the minimum value of v using $F(v)=\|x-Hv\|^2$, and improving soft estimates of the transmitted packet bits by means of the initial soft and hard estimates.

9. The apparatus of claim 8, wherein the bit corrector compares an initial hard estimate of a bit with an improved hard estimate and uses the initial soft estimate as the improved soft estimate of the bit if the initial hard estimate and the improved hard estimate match.

10. The apparatus of claim 9, wherein if the initial hard estimate and the improved hard estimate do not match, the bit corrector uses the initial soft estimate with the opposite sign and the absolute value multiplied by a certainty factor $\beta \leq 1$ as the improved soft estimate.

11. A method for signal reception in a communication system, the method comprising:
receiving signals modulated into bit-based symbols in accordance with a given modulation type, and dividing the modulated symbol stream into packets of some symbols each;
performing bit correction with respect to the modulated symbols to detect unreliable bits satisfying a predetermined condition; and
performing first decoding by:
estimating transmission coefficients of the received signals as a matrix H ;
estimating a combined variance $\sigma^2$ of noise generated from M receiving channels and a possible error in a transmission coefficient estimate of the matrix H ; and
estimating a vector symbol z of the received signals using a Log-Likelihood Ratio (LLR) according to:

$$z = W^\dagger x$$

where $W=(HH^\dagger + \sigma^2 I)^{-1}H$, W is a matrix of linear conversion, I is an M×M diagonal unitary matrix, $(.)^\dagger$ is a transposition and complex conjugation sign, and $(.)^{-1}$ is a matrix inversion sign.

12. The method of claim 11, wherein the performing of first decoding further comprises demodulating the estimated vector symbol in accordance with the given modulation type.

13. The method of claim 12, further comprising performing second decoding by:
demodulating the transmission coefficients of the matrix H in accordance with the given modulation type and forming a set of initial soft and hard estimates of the estimated vector symbol by performing hard decision and soft decision; and
determining the minimum value among absolute values of the generated soft estimates as a predetermined number of least reliable bits and comparing the determined minimum value with a threshold.

14. The method of claim 13, wherein the soft decision is performed according to:

$$B_{k,m} = \text{LLR}_{k,m}$$

where k is a modulation symbol indicator of the estimated vector and m is a modulation symbol bit indicator of the estimated vector.

15. The method of claim 14, wherein the hard decision is performed according to:

$$b_{k,m} = \begin{cases} 1, & \text{if } B_{k,m} \geq 0 \\ -1 & \text{if } B_{k,m} < 0 \end{cases}$$

where $b_{k,m}$ values at $k=\overline{1,L}$ and $m=\overline{1,N}$ form a set $b_0$ of the initial hard estimates, and $B_{k,m}$ values given the same k and m, respectively, form a set $B_0$ of the initial soft estimates of the transmitted packet bits.

16. The method of claim 15, further comprising determining the maximum number $K_{max}$ of tested bits K in advance and comparing a soft estimate with the minimum value among absolute values |B| of soft estimates B with a threshold $B_t$ in order to select bits for which these values are lower than the threshold $B_t$.

17. The method of claim 16, wherein the threshold $B_t$ is given by $$B_t = \alpha \cdot \text{mean}(|b|)$$

where mean (|b|) is a mean value of absolute values of all soft estimates b over all the transmitted packet bits, and $\alpha \leq 1$ is a proportionality factor.

18. The method of claim 17, further comprising:
generating all possible combinations of a predetermined number K of least reliable bit values, in which the number of such combinations is $2^K$;
generating a bit candidate packet $b_c$ for each combination of the K least reliable bits; and generating modulation symbol candidate vectors v corresponding to each combination by modulating the candidate packet $b_c$ of bits obtained for each combination, taking the minimum value of v using $F(v)=\|x-Hv\|^2$, and improving soft estimates of the transmitted packet bits by means of the initial soft and hard estimates.

19. The method of claim 18, wherein the improving of the soft estimate comprises comparing an initial hard estimate of a bit with an improved hard estimate and using the initial soft estimate as the improved soft estimate of the bit if the initial hard estimate and the improved hard estimate match.

20. The method of claim 19, wherein if the initial hard estimate and the improved hard estimate do not match, the initial soft estimate with the opposite sign and the absolute value multiplied by a certainty factor $\beta \leq 1$ is used as the improved soft estimate.

* * * * *